Figure 5:
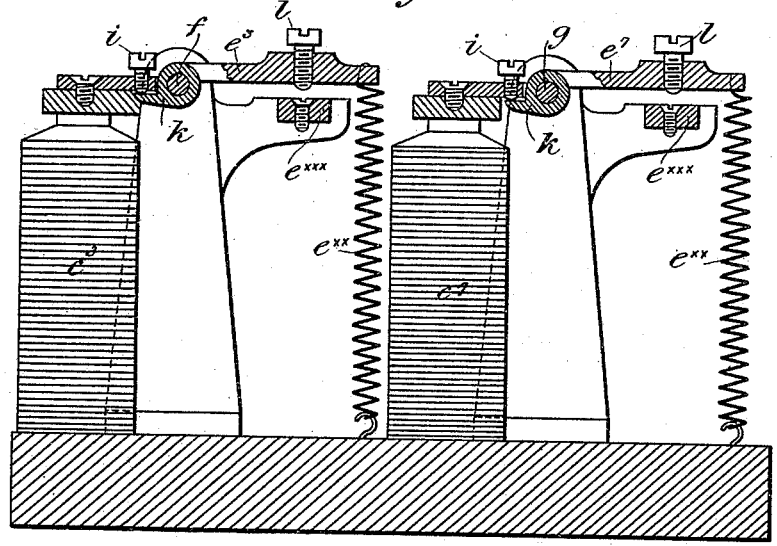

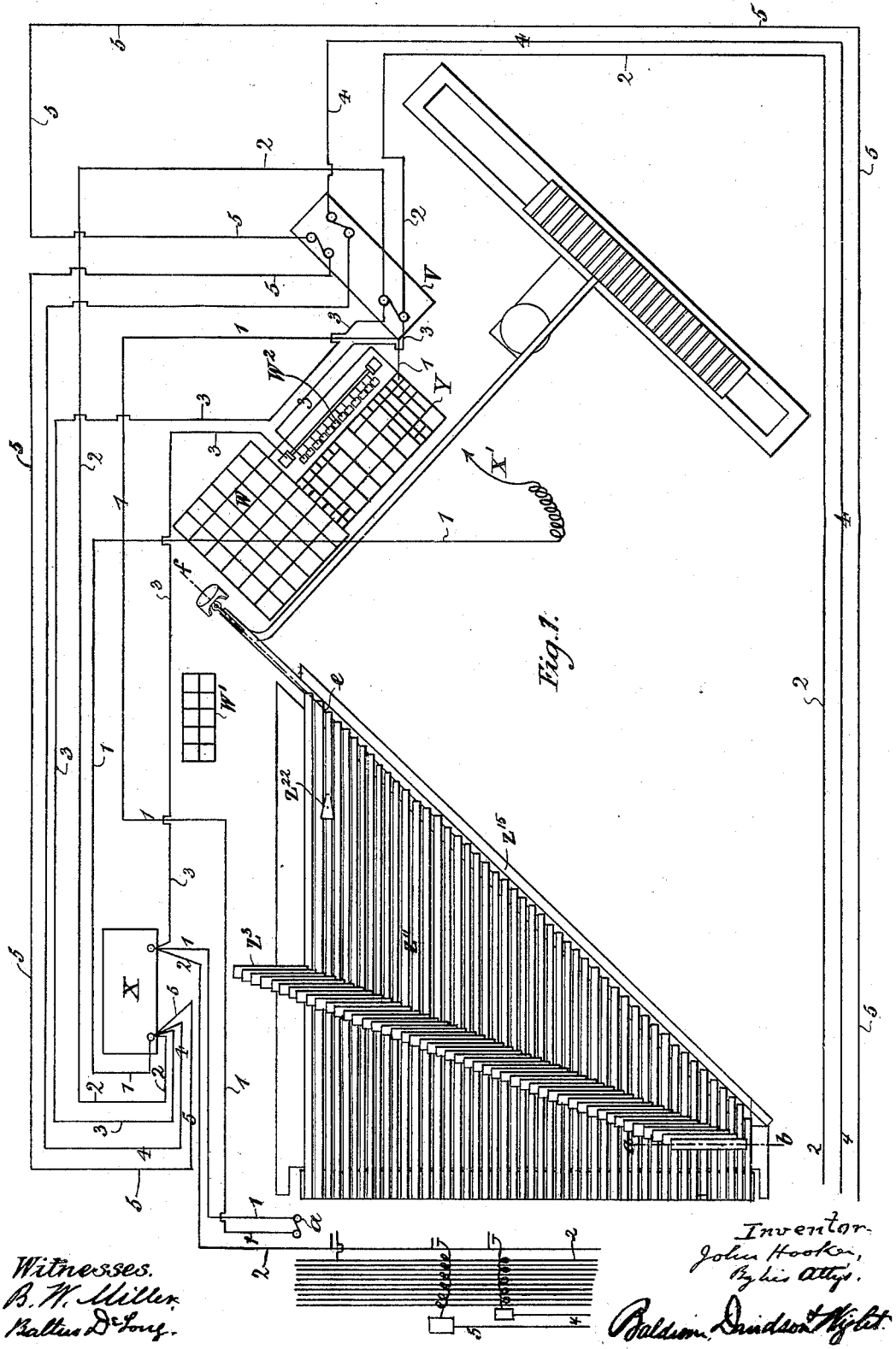

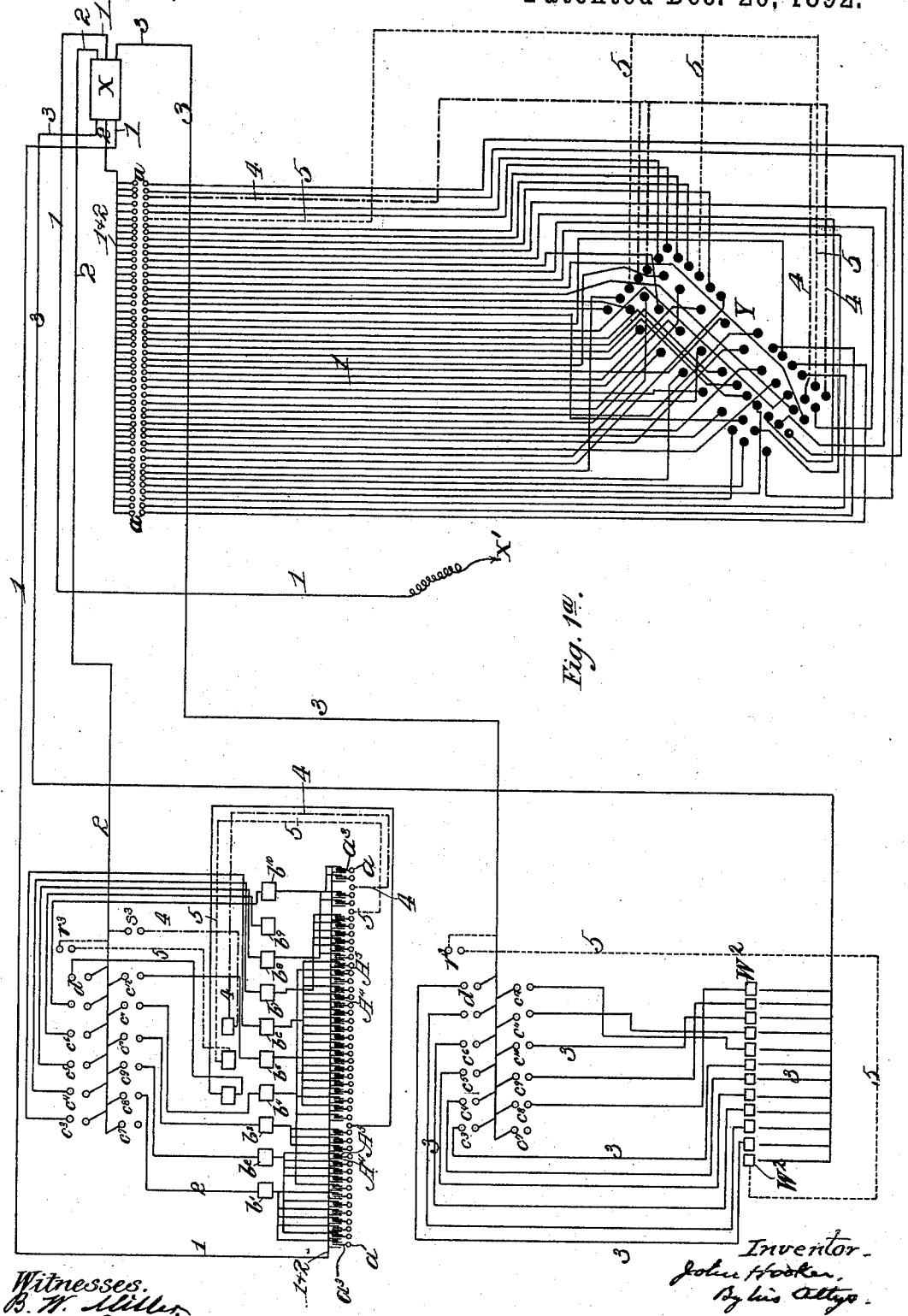

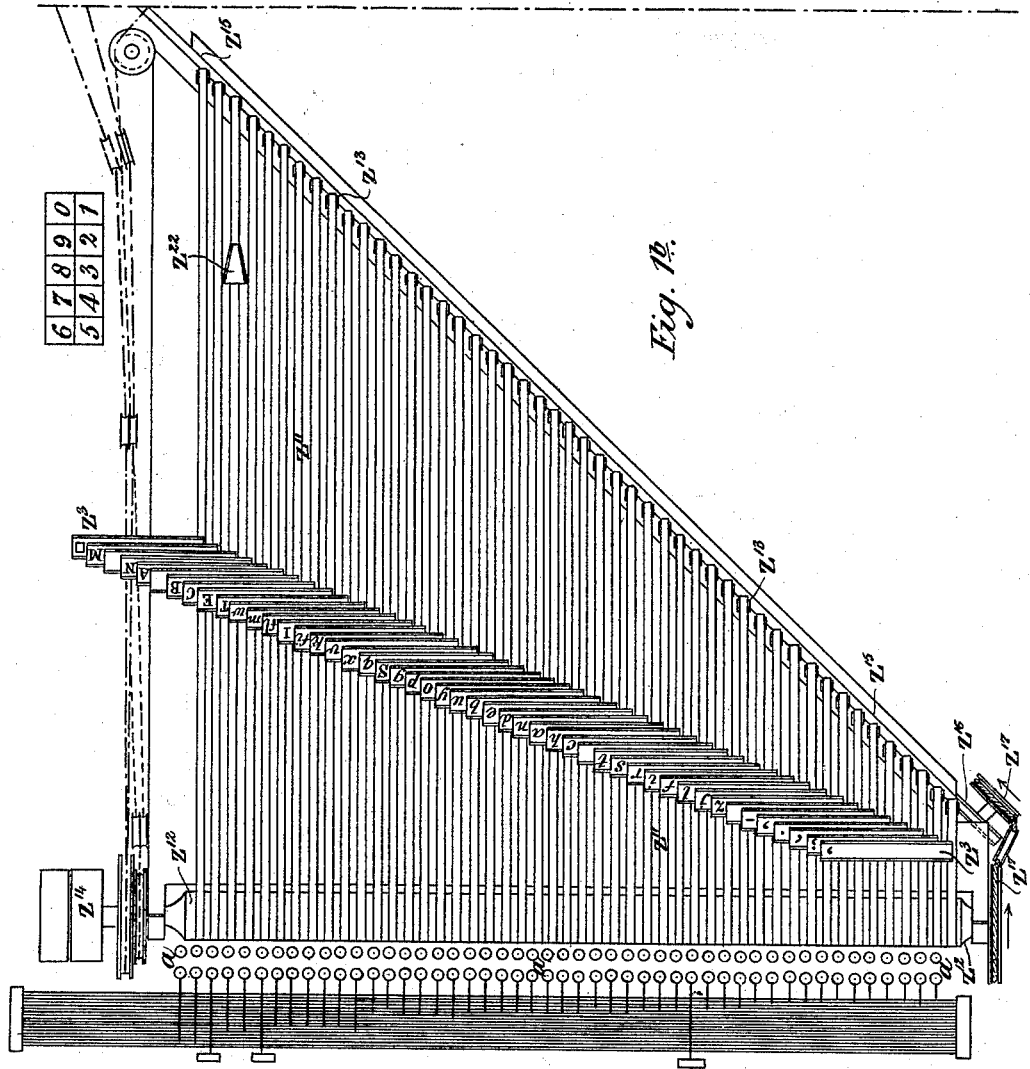

(No Model.)
J. HOOKER.
MACHINERY FOR SETTING UP TYPE.
No. 488,265. Patented Dec. 20, 1892.
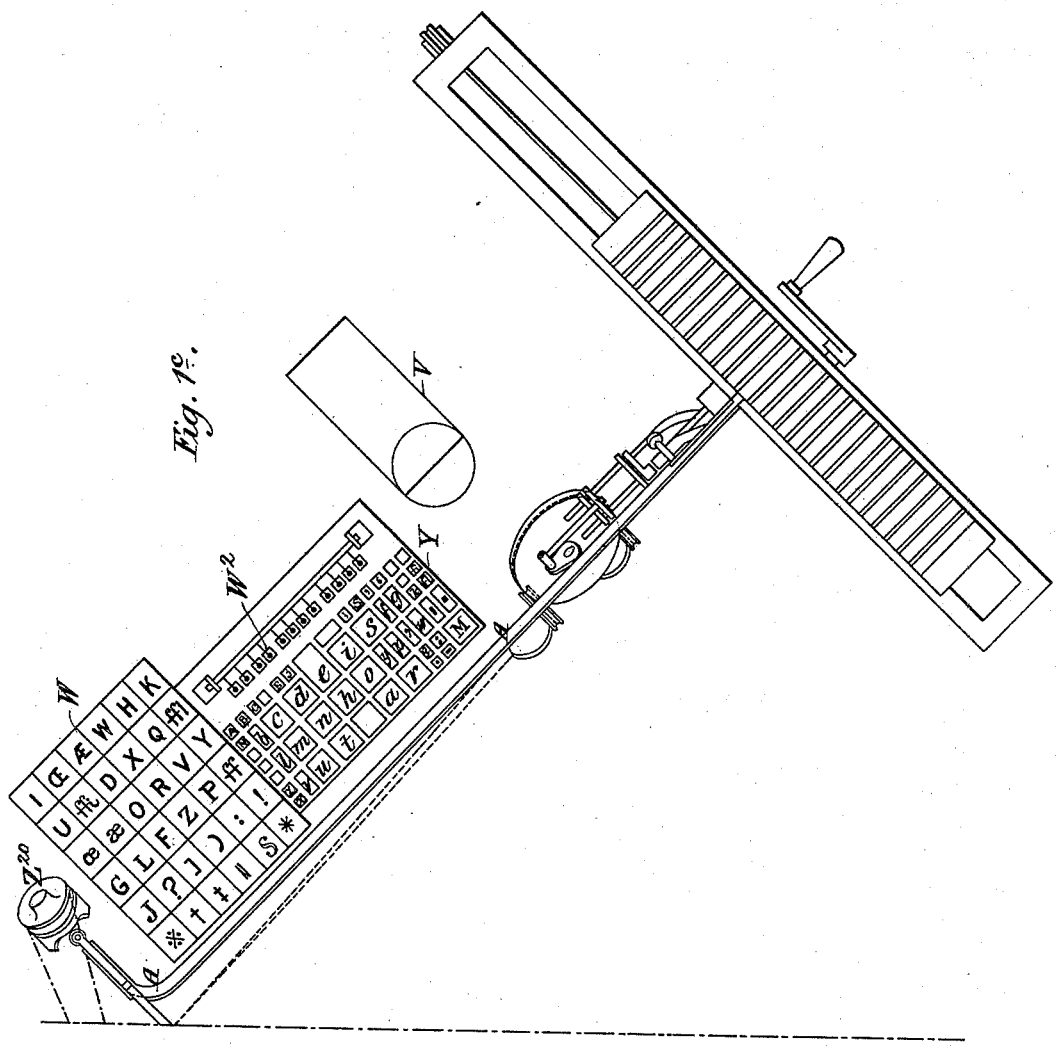
Witnesses.
B. W. Miller
Baltus De Long
Inventor.
John Hooker,
By his Atty's.
Baldwin Davidson Wight (No Model.) 19 Sheets—Sheet 5.
J. HOOKER.
MACHINERY FOR SETTING UP TYPE.
No. 488,265. Patented Dec. 20, 1892.
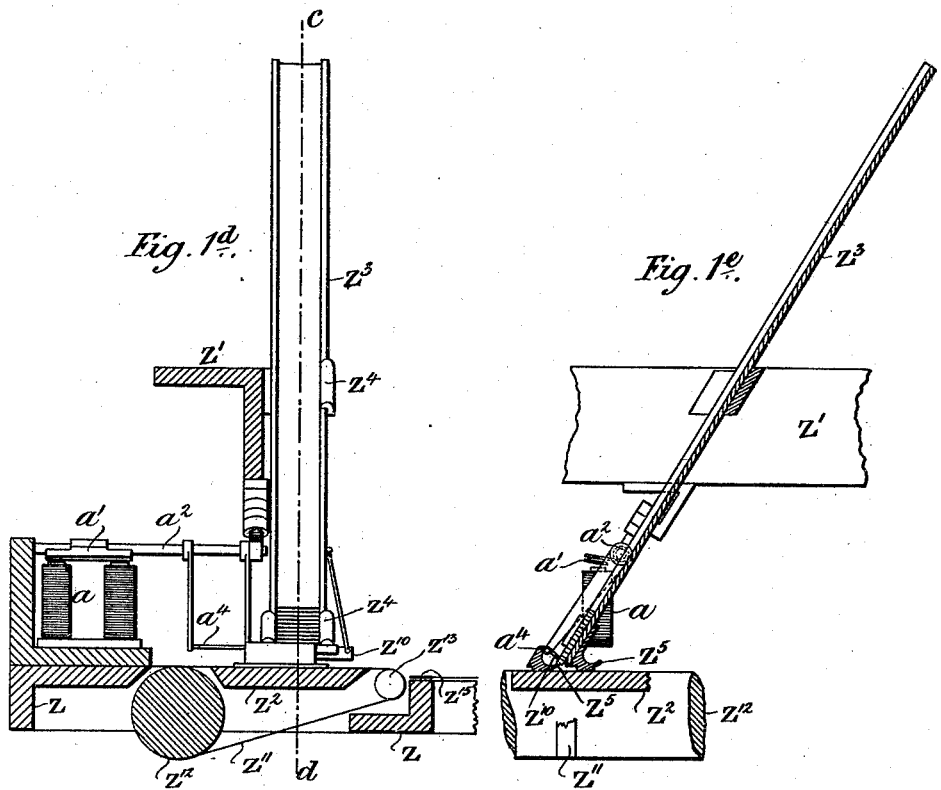
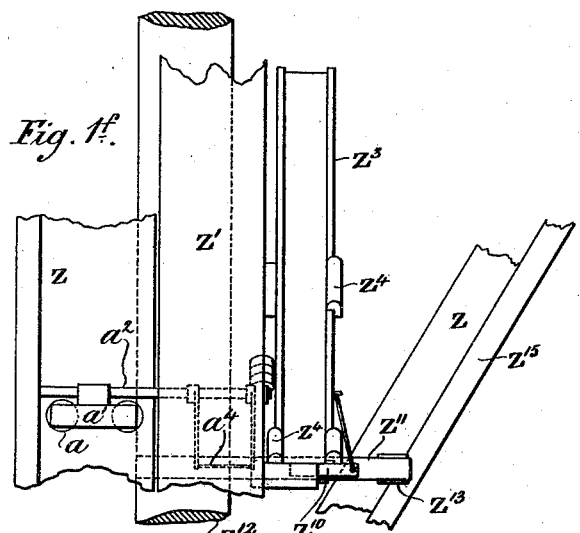
Witnesses.
B. W. Miller
Baltus DeLong
Inventor.
John Hooker.
By his Attys.
Baldwin Davidson & Wight

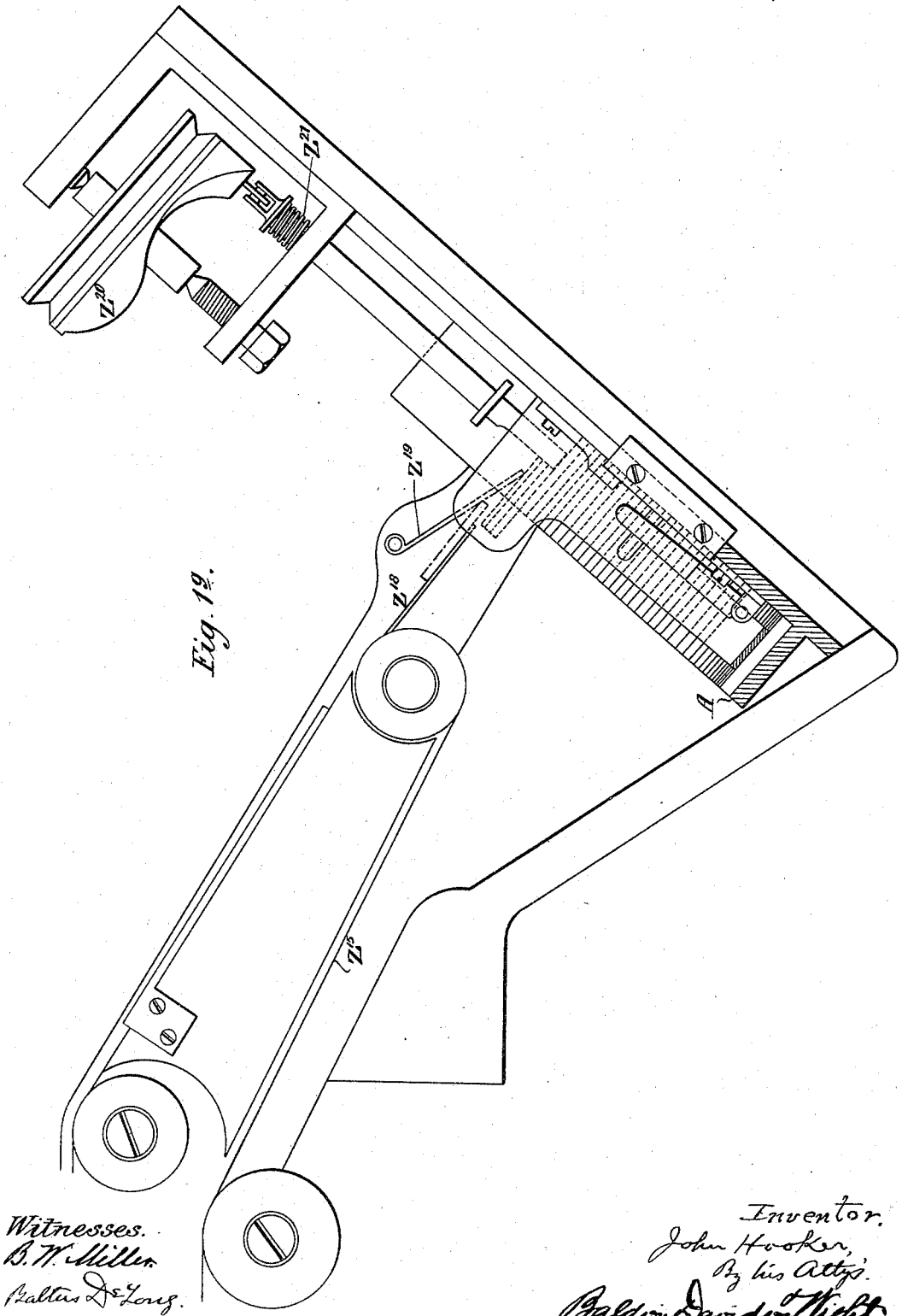

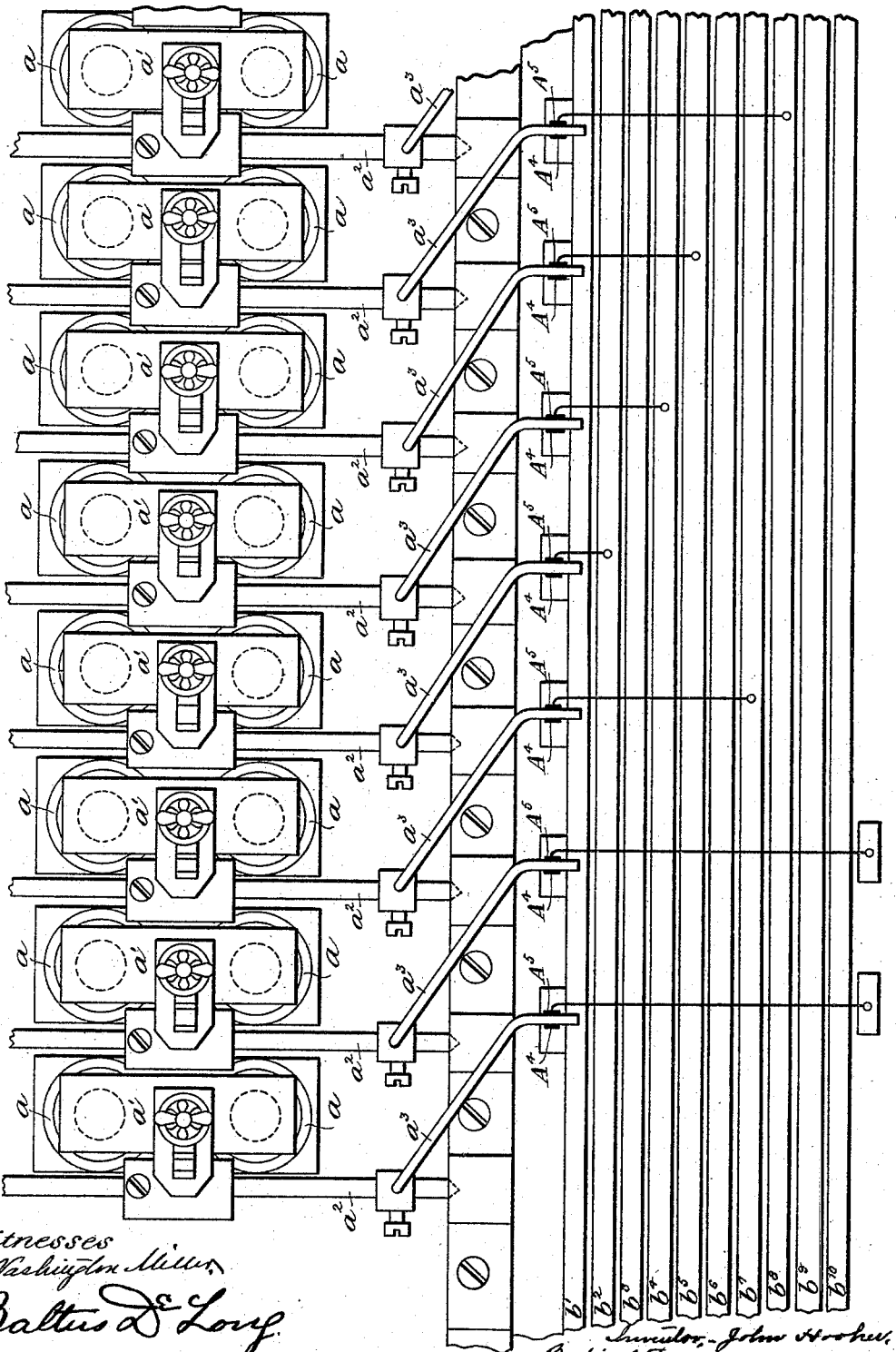

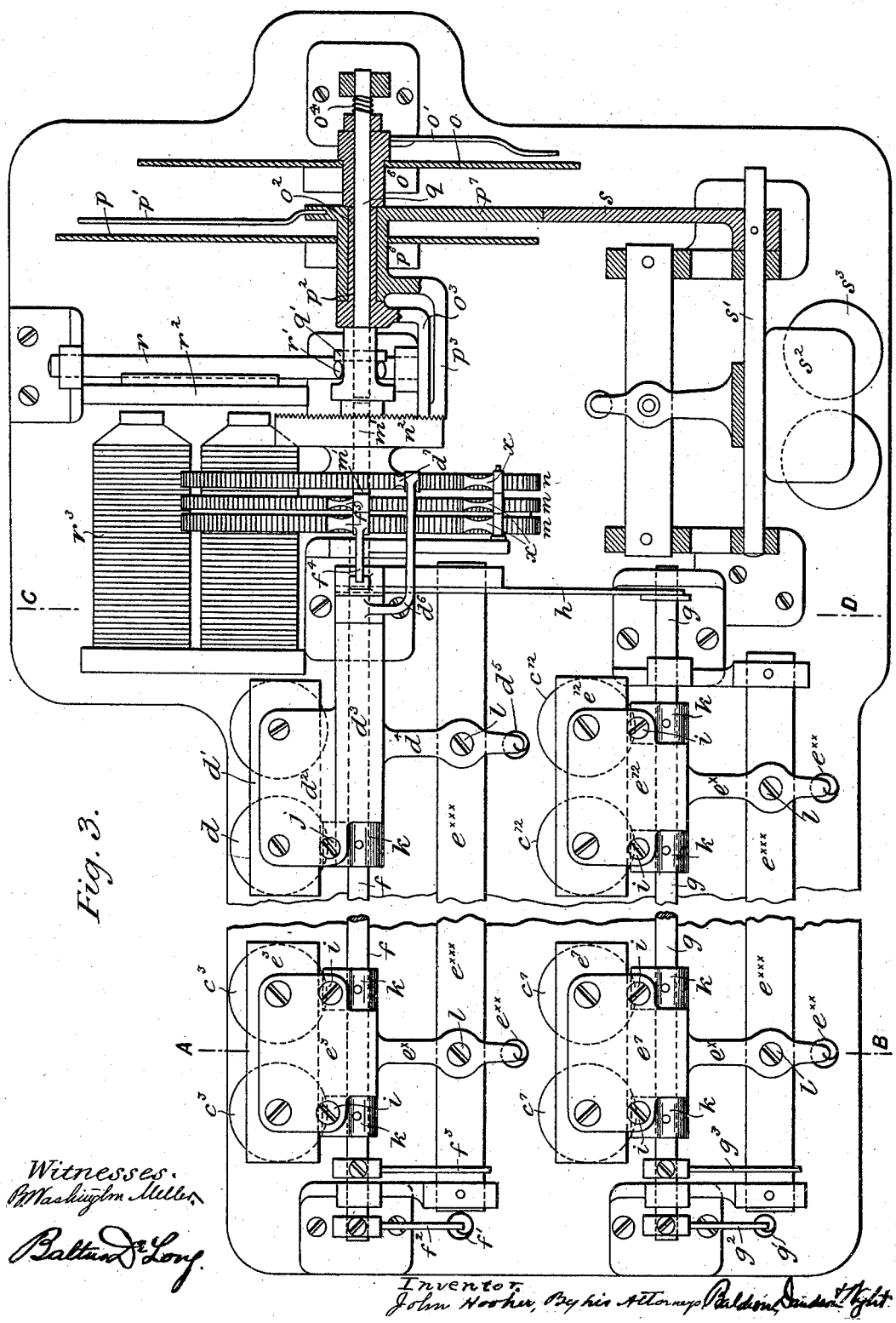

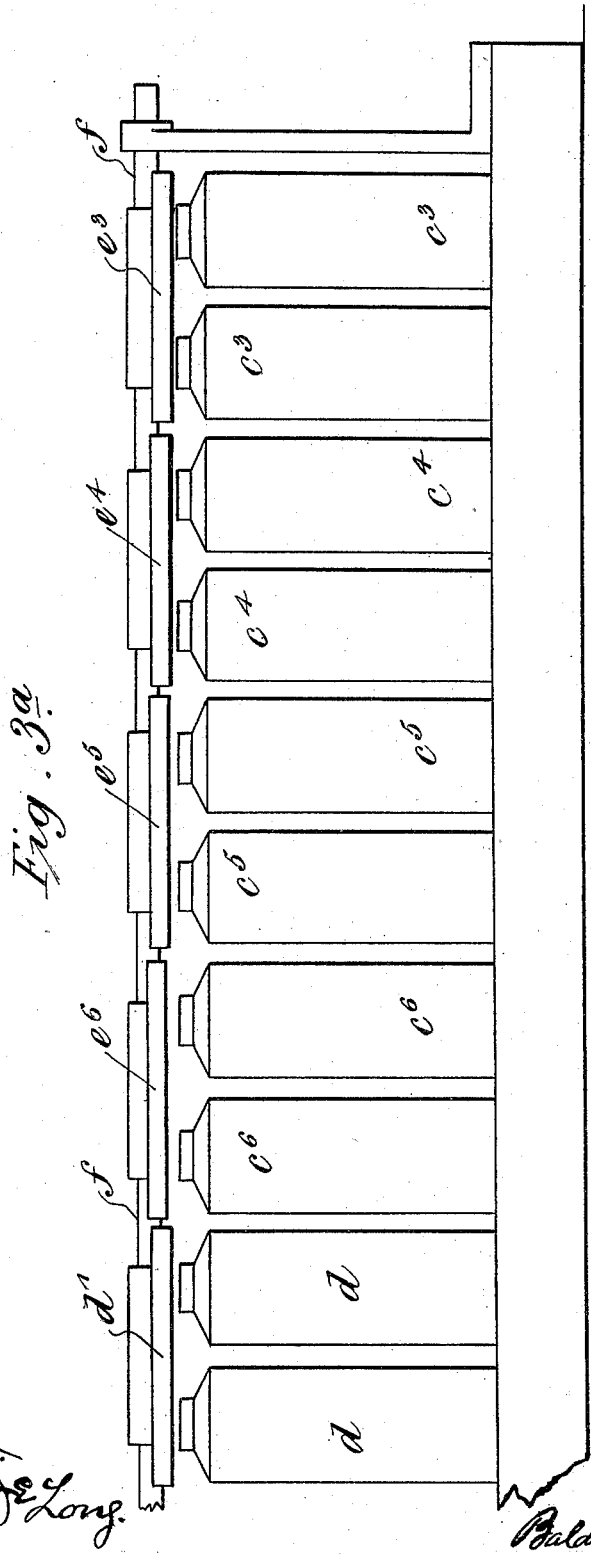

(No Model.) 19 Sheets—Sheet 10.
J. HOOKER.
MACHINERY FOR SETTING UP TYPE.
No. 488,265. Patented Dec. 20, 1892.
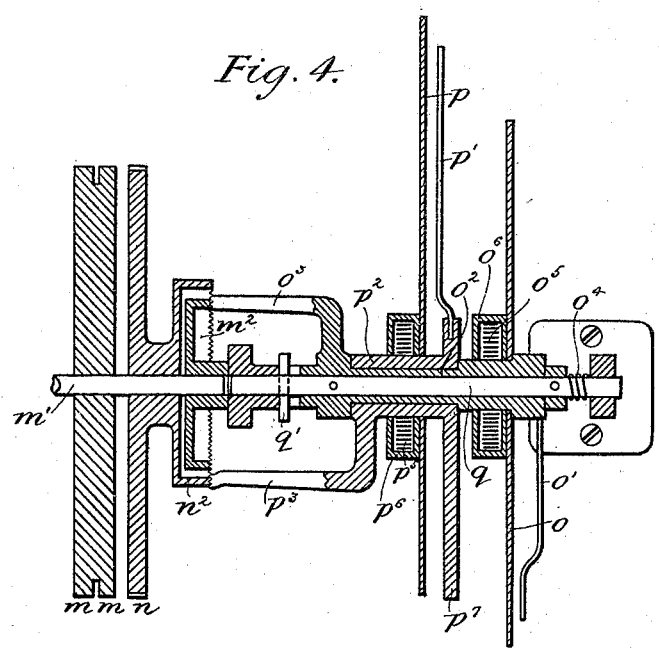
Fig. 4.
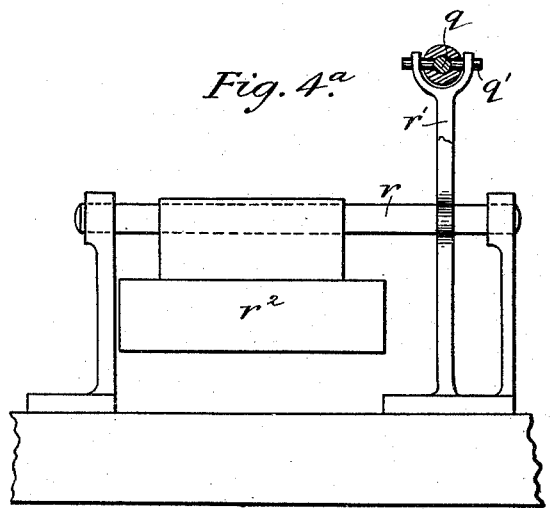
Fig. 4.ª
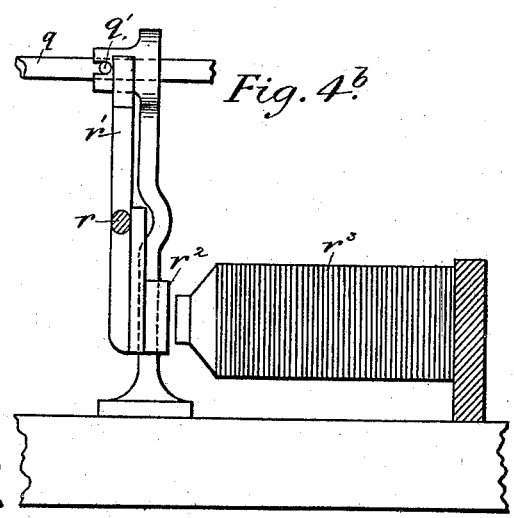
Fig. 4.ᵇ
Witnesses
B. Washington Miller
Baltus DeLong
Inventor
John Hooker
By his Attorneys
Baldwin Davidson & Wight (No Model.) 19 Sheets—Sheet 11.

J. HOOKER.
MACHINERY FOR SETTING UP TYPE.

No. 488,265. Patented Dec. 20, 1892.

(No Model.)  
19 Sheets—Sheet 12.

J. HOOKER.
MACHINERY FOR SETTING UP TYPE.

No. 488,265. Patented Dec. 20, 1892.

Witnesses  
B. Washington Miller  
Baltus De Long

Inventor  
John Hooker,  
By his Attorneys,  
Baldwin, Davidson & Wight.

(No Model.) 19 Sheets—Sheet 13.
J. HOOKER.
MACHINERY FOR SETTING UP TYPE.
No. 488,265. Patented Dec. 20, 1892.
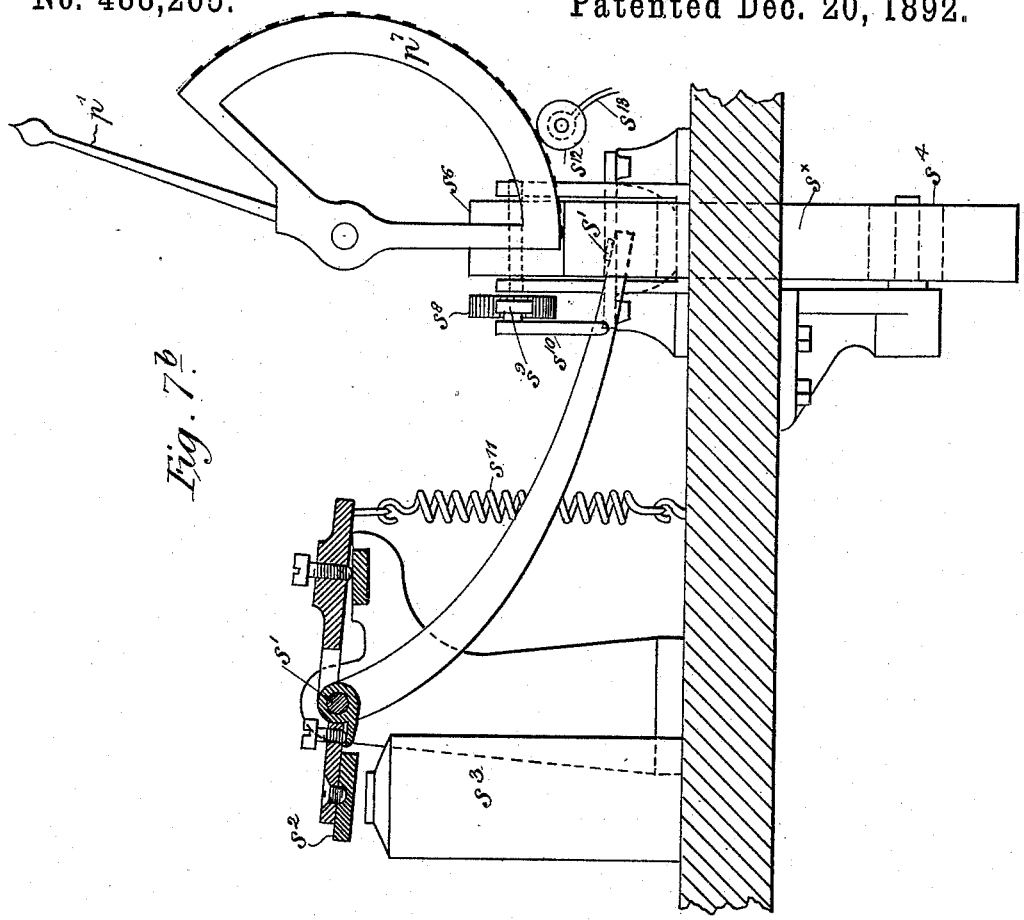
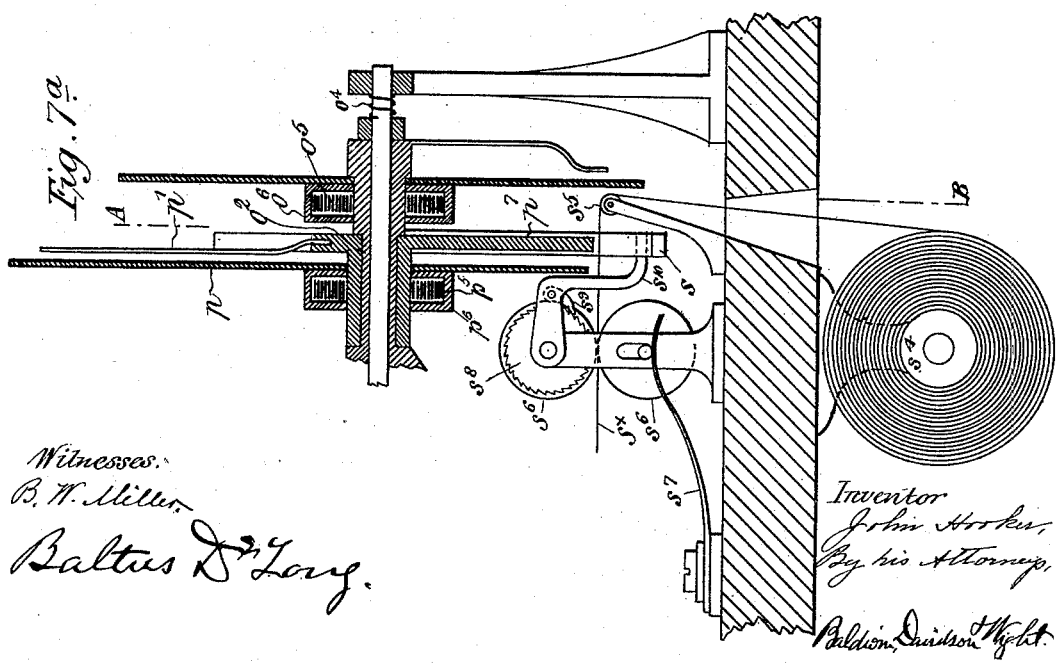
Witnesses:
B. W. Miller
Baltus D. Long
Inventor
John Hooker,
By his Attorney,
Baldwin, Davidson & Wight
THE NORRIS PETERS CO., PHOTO-LITHO., WASHINGTON, D. C.

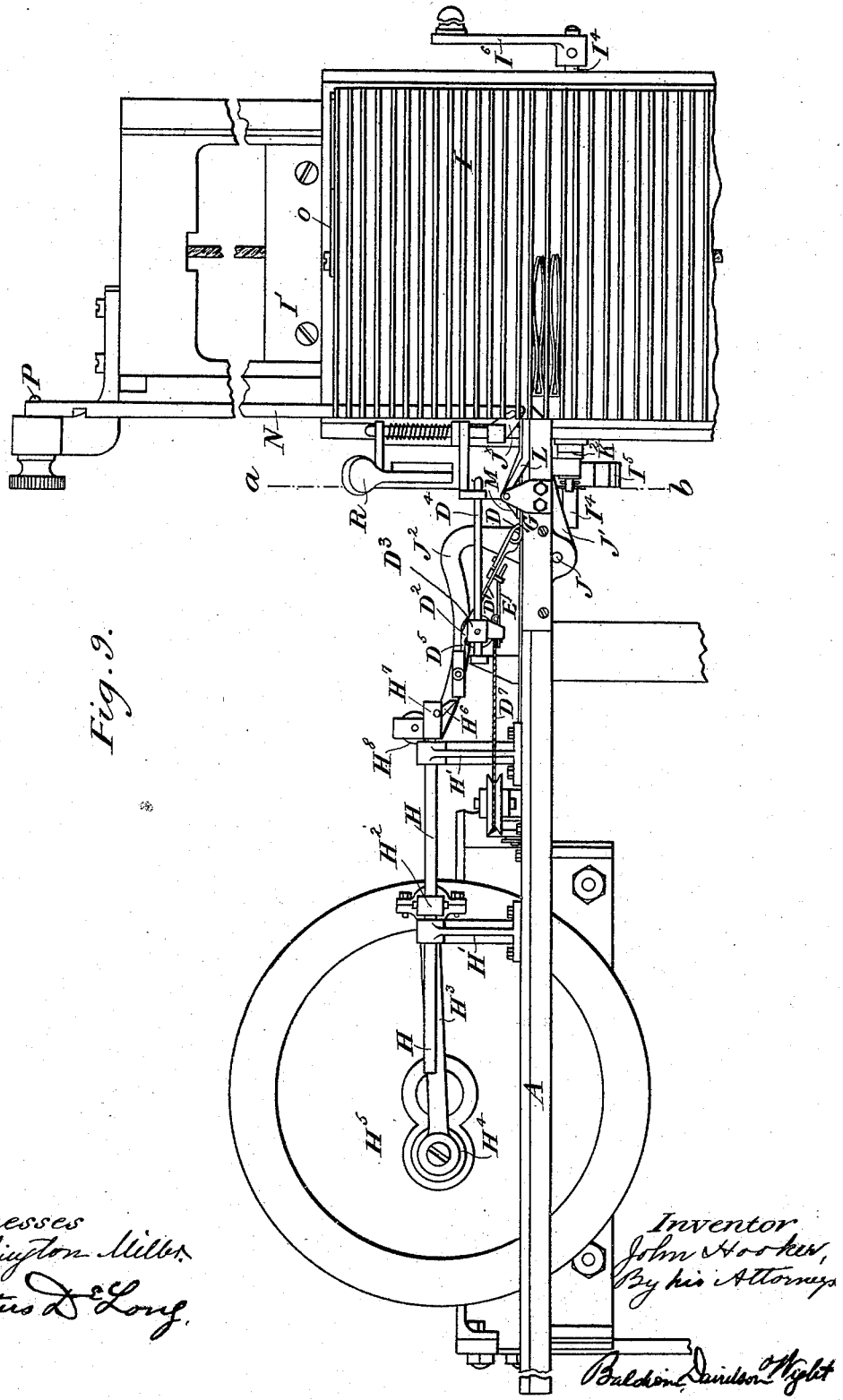

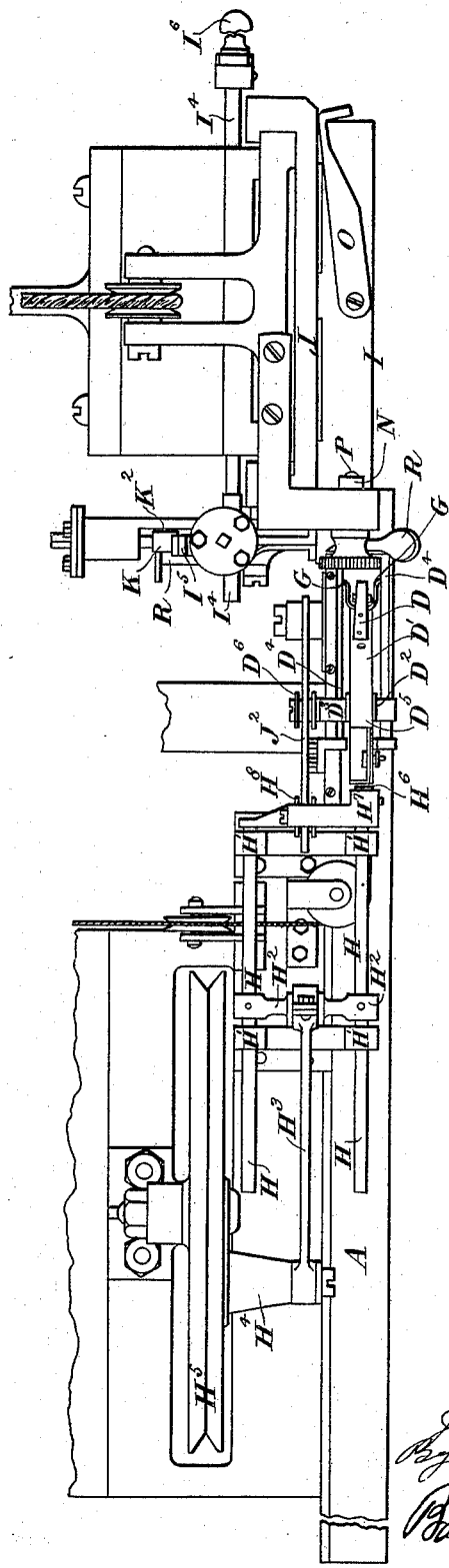

(No Model.)  19 Sheets—Sheet 16.
J. HOOKER.
MACHINERY FOR SETTING UP TYPE.
No. 488,265.  Patented Dec. 20, 1892.
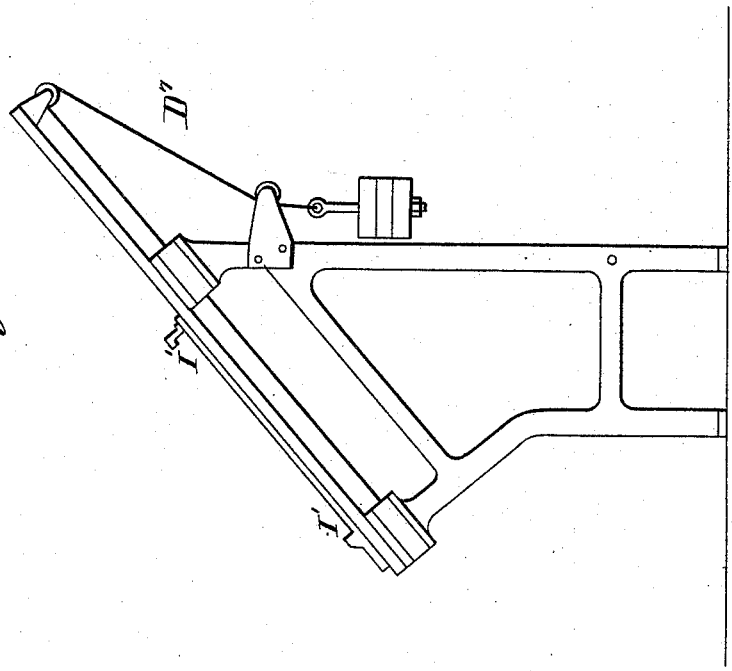
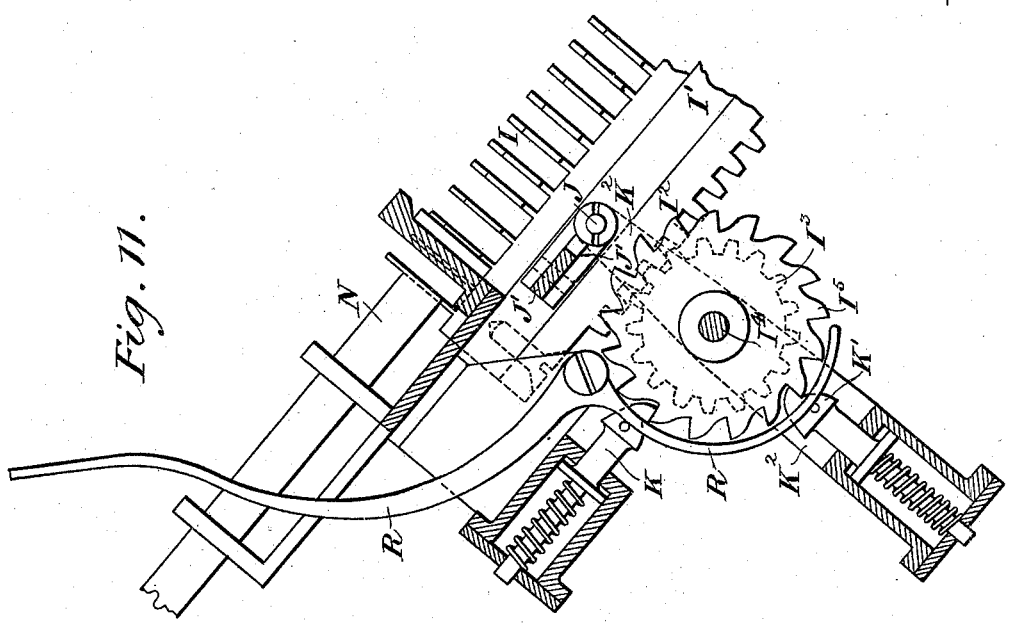

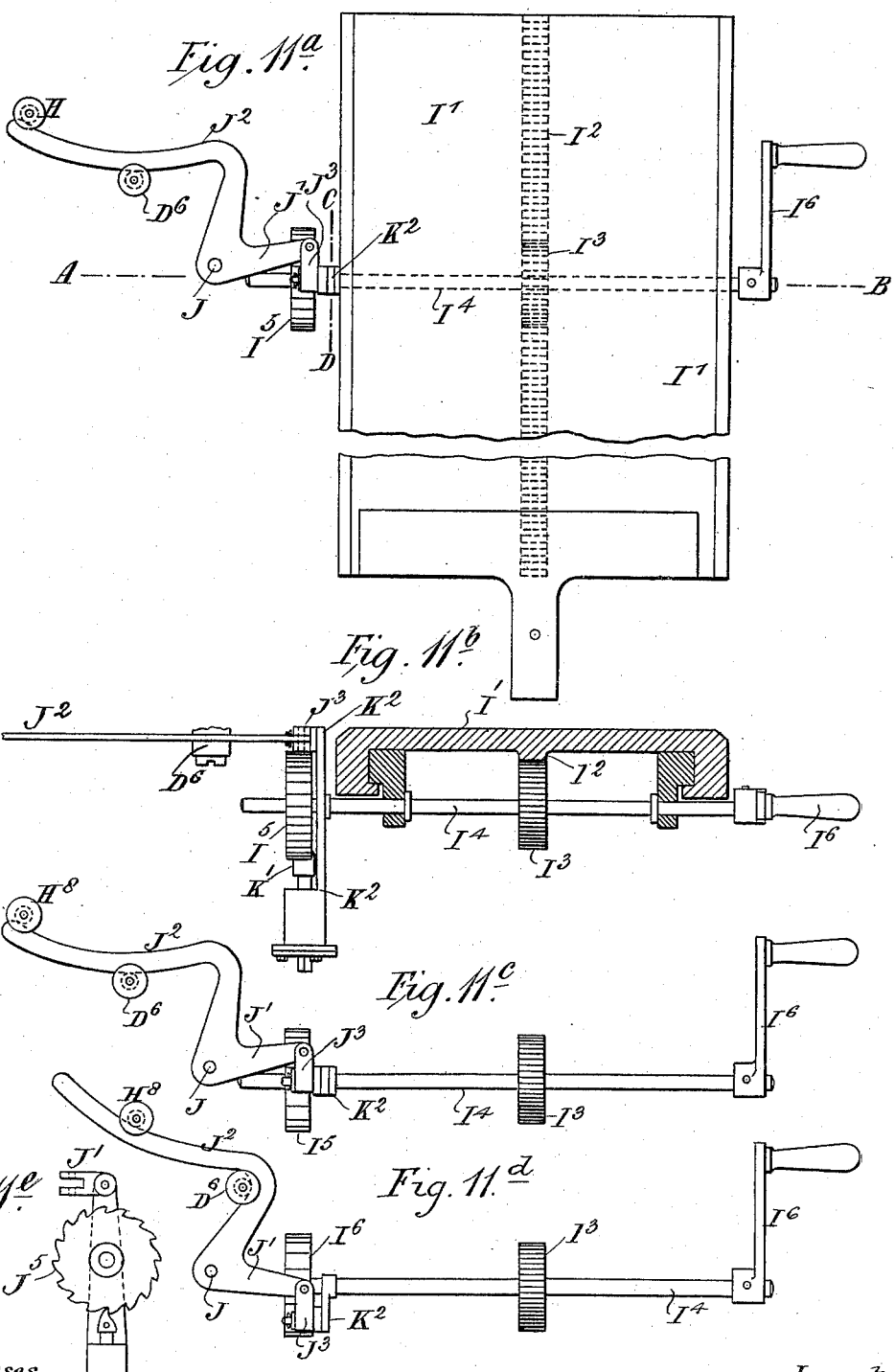

(No Model.) 19 Sheets—Sheet 18.

J. HOOKER.
MACHINERY FOR SETTING UP TYPE.

No. 488,265. Patented Dec. 20, 1892.

Witnesses
B. Washington Miller
Baltus D. Long

Inventor
John Hooker,
By his Attorneys,
Baldwin, Davidson & Wight (No Model.) 19 Sheets—Sheet 19.

J. HOOKER.
MACHINERY FOR SETTING UP TYPE.

No. 488,265. Patented Dec. 20, 1892.

UNITED STATES PATENT OFFICE.

JOHN HOOKER, OF BECCLES, ENGLAND.

MACHINERY FOR SETTING UP TYPE.

SPECIFICATION forming part of Letters Patent No. 488,265, dated December 20, 1892.

Application filed November 23, 1891. Serial No. 412,814. (No model.)

*To all whom it may concern:*

Be it known that I, JOHN HOOKER, printer, a subject of the Queen of Great Britain, residing at Lancaster Place, Station Road, Beccles, in the county of Suffolk, England, have invented certain new and useful Improvements in Machinery for Setting Up Type, of which the following is a specification.

My invention has for its object:—first, to enable a compositor working a type-setting machine to expeditiously make divisions or breaks in the continuous line of type which issues from the machine so as to divide this line into short lines of approximately the required length for the width say of the page of a book; second, to deliver these short lines one by one into a galley by the action of a pusher which is continuously reciprocating to and fro.

For setting up type into a continuous line I employ a setting up machine such as is described in the specification of a British patent granted to me No. 477 in the year 1874. In this machine the various type are contained in reservoirs and whenever a type is required to be taken from any one of the reservoirs the lowest type in that reservoir is ejected by a pusher actuated by an electro magnet.

According to my present invention I provide the setting up machine with an indicator one hand or pointer of which indicates on a dial the increase in length of the type line as each type is liberated from its reservoir— while another pointer indicates the number of words or spaces in the line. To give motion to the hands or pointers I attach contact arms to the armatures of the electro magnets above mentioned by which when any one or other of the armatures is drawn to its magnet a circuit is completed through the coils of one or other of a series of electro magnets used for giving movement to the hands of an indicator and I so arrange the mechanism that the amount of movement given at each movement to the hands is made dependent upon the thickness of each particular type. When the operator sees by the indicator that the end of a line is arrived at he causes two specially formed "blanks" to be set up at the end of the line to divide it from the next. The armature of the electro magnet which causes the delivery of the second blank carries a contact arm which completes a circuit through the coils of another electro magnet the armature of which when attracted liberates the indicator hands from their axes and allows them to be brought back to zero by a weight or spring. To deliver the short lines one by one into a galley I make the line of type as it advances toward the galley to pass under a finger or feeler which is pressed lightly against the type by a spring. The finger is made to bear upon the center of each type as it passes below it. The blanks above mentioned are hollowed at the center so that when the blanks come below the finger the finger drops between them and two pins which it carries drop into two holes formed through the two ends of the foremost blank. The finger is carried by a block which can be moved to and fro along guides which are parallel with the line of type. As the finger drops, an arm on the opposite side of its axis is raised. This brings it into the path of a pusher to which a slow reciprocating to and fro movement is continuously imparted. When the pusher in its forward movement comes against the tail end of the finger it carries the finger forward along with it and so carries forward the blank which the finger is holding and all the types that are in front of the blank and pushes them into one of the lines or divisions of a galley which at the time has been brought to coincide with the line of type. After a line has so been delivered into the galley it is caused to rise a proper distance by a rack attached to it and by a pawl moved at the required time.

Figure 1 is a diagram plan view of the machine, showing the electrical connections for one of each of the magnets. Fig. 1ª is a diagram view of all of the electrical connections. Fig. 1ᵇ is a plan view on a larger scale of the left-hand portion of the machine, and Fig. 1ᶜ, a similar view of the right-hand portion of the machine. Fig. 1ᵈ is a section on a larger scale on the line *a, b*, Fig. 1, showing the mechanism for ejecting type, one by one, from the bottom of the reservoirs. Fig. 1ᵉ is a section on the line *c d*, Fig. 1ᵈ. Fig. 1ᶠ is a plan view of the parts shown in these figures. Fig. 1ᵍ is a section on a larger scale, taken through the line *e f*, Fig. 1, and showing the mechanism for setting up the type into line.

Figure 6:
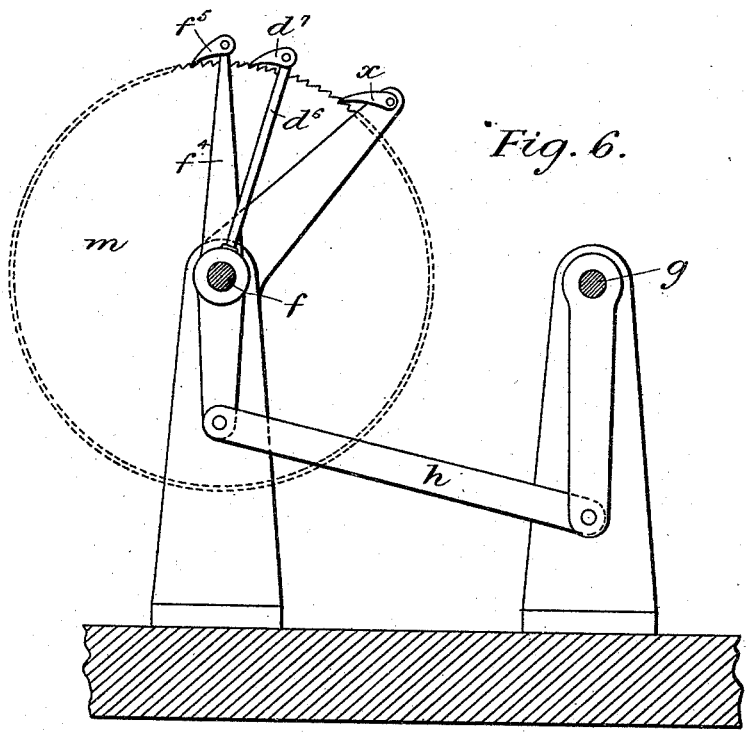
Figure 7:
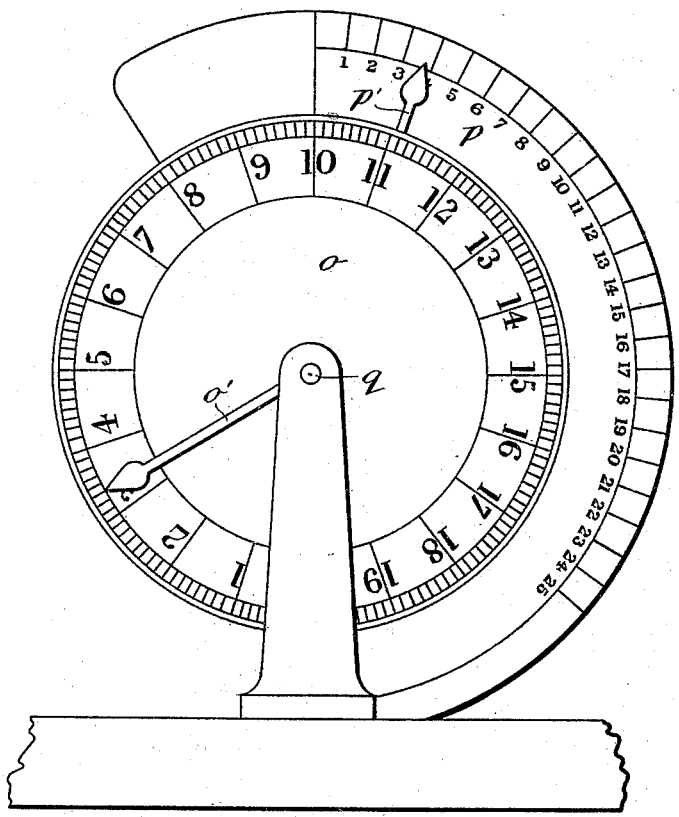
Figure 8:

The mechanism shown by the above drawings is constructed in the manner described in the specification of my British patent, above mentioned. Fig. 2 is a plan view of some of the magnets of the row of magnets of the type setting machine showing the arrangement of contact arms for sending electric currents for actuating the indicator mechanism. Fig. 3 is a plan view partly in section of the indicator mechanism. Fig. $3^a$ is a front view of the row of magnets $c^3$ $c^4$ $c^5$ $c^6$ and $d$. Fig. 4 is a longitudinal section of a portion of the same. Figs. $4^a$ and $4^b$ are detached views showing the electro magnet $r^3$ and parts worked by it. Fig. 5 is a section on the line A B. Figs. 3 and 6 a section on the line C D Fig. 3. Fig. 7 is a face view of the dials. Fig. $7^a$ is a vertical longitudinal section of the dials and printing mechanism. Fig. $7^b$ is a vertical section on the line A B, Fig. $7^a$, and Fig. 8 shows views of the special type employed for separating the end of one line from the beginning of the next. Figs. 9 to 12 show the mechanism for dividing the continuous line of type into lines. Fig. 9 is a view taken at right angles to the receiving galley. Fig. 10 a view taken parallel with the galley. Fig. 11 is a section on a larger scale taken through $a\,b$ Fig. 9. Fig. $11^a$ is a face view of the galley holder I' and some of the parts used for giving endwise motion to it. Fig. $11^b$ is a cross section on the line A B Fig. $11^a$. Figs. $11^c$ and $11^d$ are diagram views illustrating the way in which motion is given to the galley holder. Fig. $11^e$ is a section taken through the line C D, Fig. $11^a$, and Fig. 12 is an end elevation on a small scale of the whole machine. Figs. 13 to 19 are diagrams explaining the action of the same.

In Figs. 1 to $1^f$, Z is a horizontal triangular frame supported upon legs or other supports.

Z' is a bar passing across the frame and supported at its ends by uprights from the frame Z. $Z^2$ is a bar also passing across the frame and parallel with the bar Z'.

$Z^3$ are reservoirs containing type; they slide into guides $Z^4$, fixed to the bars Z', $Z^2$. A projection on the back of each rests on the top of one of the guides $Z^4$, and the reservoirs are so upheld in place.

$Z^5$ are tail-pieces at the back of the lower guides $Z^4$; the lowest type in the reservoirs come down onto these tail-pieces.

$a$ are electro-magnets—one for each reservoir $Z^3$. The armature $a'$, of each magnet, is carried on a spindle $a^2$, and is normally held away from the magnet-poles by the action of a spring or weight; another axis $a^4$, on the same spindle, carries at its lower end a small blade $Z^{10}$ (see Figs. $1^a$ and $1^c$) which serves to strike away the lowest type from the type reservoir, whenever the armature is attracted by the magnet.

Y is a composing or contact table in front of which the operator is situated; it has upon it a number of metallic plates, all insulated from one another, there being as many such contact plates as there are type-reservoirs $Z^3$. From each plate an insulated wire is led to one end of the coils of one or other of the magnets $a$. From the other end of the magnet coils an insulated wire is led to one of the poles of a small dynamo or battery X. To the other pole of this dynamo or battery is connected a flexible insulated wire having at its end a metallic point or pencil X' which the operator holds in his hand. In this way, when the operator touches one or other of the contact plates on the contact table Y, an electric circuit marked 1 in Figs. 1, $1^a$, is completed through the coils of one or other of the magnets $a$, and a type is ejected from the bottom of the type reservoir $Z^3$, with which this magnet operates. The circuit for one of the magnets only is shown in Fig. 1, but, as shown in Fig. $1^a$, there is a similar circuit for each magnet.

$Z^{11}$ are endless tapes which pass below the reservoirs, one below each reservoir. All the tapes pass around a roller $Z^{12}$, each tape also passes around a small roller $Z^{13}$; these rollers are supported in brackets fixed to the top of the long side of the triangular frame Z. The roller $Z^{12}$ has a continuous revolving motion imparted to it by an endless driving-band working over a pulley $Z^{14}$ on its end.

$Z^{15}$ is another endless tape supported for the most part parallel with the long side of the frame; the roller $Z^{16}$, around which it passes at one end of this side of the frame is driven continuously by an endless cord $Z^{17}$ from a pulley on the roller $Z^{12}$. The type, as they are ejected one by one from the reservoirs $Z^3$, drop on to the tapes $Z^{11}$, which deliver them on to the endless tape $Z^{15}$, and this tape delivers them one after the other on to an inclined plate $Z^{18}$, down which they slide to be put into line in the channel A.

The way in which the type are put into line is best seen in Fig. $1^g$, which is a section on a larger scale taken through the line $e\,f$, Fig. 1. The type, as they pass off the inclined plane $Z^{18}$, come above the uppermost type previously contained in the channel A, as they do so, they come below a light hinged plate $Z^{19}$, which rests upon them and keeps them from rebounding. When they have dropped into the channel they are pushed downward along it by a constantly reciprocating pusher. The pusher is moved in one direction by a revolving cam $Z^{20}$, and in the opposite direction by a spring $Z^{21}$. Any type which, as indicated in Fig. $1^g$, may come against the side of the pusher when it is making its forward stroke, will slide down into proper position in the channel when the pusher retires. The cam $Z^{20}$, is revolved continuously by an endless cord passing around a pulley on its axis, and also around a pulley on the axis of the roller $Z^{12}$, as shown in Fig. $1^a$. W and W' are boxes containing a supply of such types as are but seldom used and for which a reservoir $Z^3$, is not provided. When any one or other of these types is to be used, the operator takes it from the box and drops it into a small funnel hopper $Z^{22}$ (see Figs. 1, $1^b$) which conducts it down on to one of the tapes $Z^{11}$, and it is then set up into line with the others in the way above described. In all the above respects the mechanism for ejecting type from reservoirs and for setting the ejected type up into line is constructed in the manner described in the specification of the British patent hereinbefore mentioned granted to me.

V is a casing containing the indicator mechanism for showing to the operator the length of the type line as each type is liberated from its reservoir. The construction of this mechanism is shown in Figs. 3 to 8.

The way in which the requisite electrical contacts are made for actuating the indicator is shown best in Fig. 2. The axes $a^2$, which carry the armatures $a'$, of the electro-magnets $a$, have upon them arms $a^3$. When any axis $a^2$, is rocked by reason of the armature which it carries being attracted by its magnet the end of the arm $a^3$, descends between two contact springs $A^4$ $A^5$ which are insulated from one another and makes an electrical contact between them. The contact springs $A^4$ are all connected to one pole of the small dynamo or battery X. The contacts $A^5$ are connected to one or other of a series of electrical conductors $b'$ &c. to $b^{10}$. From each of these electrical conductors a wire is led to one end of the coils of one or other of a series of twelve electro magnets $c^3$ to $c^{12}$ of the indicator mechanism shown in Figs. 3 to 8. The other end of the coil of each electro magnet is coupled to the other pole of the battery. One of these electrical circuits is marked 2, in Fig. 1. All of the electrical circuits are shown in Fig. $1^a$. Or instead of using the plates $A^4$ the arms $a^3$ may all be placed in electrical contact with one pole of a battery through a binding screw attached to the metal of the machine to which the springs for bringing back armatures are attached, and spring contact pieces fixed to the ends of arms $a^5$ which when armatures of composing machine are attracted will make a rubbing contact with pieces $A^5$.

All contacts in connection with the electrical conductors $b'$ are for types of the same thickness. Those in connection with $b^2$ are for types of another thickness and so on.

Two of the magnets $a$ Fig. 2 are for discharging the two special spaces which are to be set up at the end of each line. In the drawings they are shown to be the two at the left hand end of the row of magnets but they might be in any other position. In this way whenever the armature of one or other of the numerous electro magnets of the composing machines is attracted by its magnet the armature of one or other of the twelve electro magnets of the indicating machine is attracted likewise the particular magnet set into action being dependent on the thickness of the type ejected from the composing machine. If the type ejected by the action of the electro magnet is the thickest of the type used then the electro magnet $c^{12}$ would be caused to attract its armature. If the type ejected is only one quarter of the thickness of the thickest type then the magnet $c^3$ is caused to attract its armature and so on for any of the intermediate thicknesses.

$d$ is an electro magnet through the coils of which a current is sent whenever a space is ejected from the composing machine.

$e^3$ to $e^{12}$ are the armatures of the magnets $c^3$ to $c^{12}$. The arms which carry the armatures $e^3$ to $e^6$ are loose upon a spindle $f$. They have also arms $e^x$ projecting backward from them which are drawn by springs $e^{xx}$ against a fixed bar $e^{xxx}$. The armature arms $e^7$ to $e^{12}$ are loose upon a spindle $g$ and arms $e^x$ projecting backward from them are similarly drawn by springs $e^{xx}$ against another fixed bar $e^{xxx}$. The spindles $f$ and $g$ are coupled by arms upon them connected together by a connecting rod $h$ as shown in Fig. 6 so that when the spindle $g$ is turned the spindle $f$ turns with it and to a greater extent as the arm on the spindle $g$ is longer than the arm on the spindle $f$. This is done in order that the armatures which have to advance the ratchet wheel a longer distance may be brought nearer to the cores of their magnets. The armature $d'$ of the magnet $d$ is carried by an arm $d^2$ that stands out from a tube $d^3$ which can turn freely around the spindle $f$. The tube $d^3$ has also an arm $d^4$ extending from it which by a spring $d^5$ is drawn downward onto the stop bar $e^{xxx}$. Each arm $e^3$ to $e^{12}$ has a pair of screws $i$ passing down through it see Fig. 5. The lower ends of these screws come against arms $k$ which are fixed to the spindles $f$ and $g$. The arm $d^2$ has also a screw $j$ passing through it to come against an arm $k$ fixed to the spindle $f$. In this way whenever the armature of any one of the magnets is attracted the spindle $f$ is turned a distance and so soon as the armature is released the spindle is turned back to its normal position by the action of a spring $f'$ which is coupled to an arm $f^2$ fixed upon the spindle. The spring turns the spindle back until an arm $f^3$ which projects from it comes down onto the bar $e^{xxx}$. Similarly the spindle $g$ has an arm $g^2$ upon it to which a spring $g'$ is coupled to draw another arm $g^3$ which is fast upon the spindle down on to a bar $e^{xxx}$. In this way the armatures are normally held at different distances from their magnets the armature $e^3$ is nearest to its magnet the armature $e^4$ at a slightly greater distance and so on—the distance being adjusted by the screws $i$ or by screw stop pins $l$ which screw through the arms $e^x$.

On the spindle $f$ is an arm $f^4$ see Fig. 6 carrying two pawls $f^5$ to engage with the teeth of ratchet wheels $m$ which are side by side and fast on a spindle $m'$. The wheels are set so that the teeth on one wheel are half a tooth in advance of the teeth of the other wheel so that between them they form one ratchet wheel having twice as many teeth as each separate wheel. The tube $d^5$ which is free to turn around the spindle $f$ has also an arm $d^6$ see Fig. 3 extending from it which carries a pawl $d^7$ that engages with the teeth of a ratchet wheel $n$ which can turn freely around the spindle $m'$.

$x\ x$ are pawls for preventing the ratchet wheels $m$ and $n$ from being turned in a backward direction.

The spindle $m'$ has fast with it a wheel $m^2$ see Fig. 4 that has fine teeth cut in the side face of its rim. Similarly the ratchet wheel $n$ has fast with it a similar wheel $n^2$ and through these two wheels motion is transmitted to the two hands of the indicator dials.

The dial $o$ is the one on which is indicated the length of the line of type set up by the composing machine after its indicator hand $o'$ has started from zero and $p$ the dial upon which is indicated the number of spaces that have been introduced into the line. The hand $o'$ is fast on a sleeve $o^2$ which can turn freely around a spindle $q$ and the hand $p'$ is fast on a sleeve $p^2$ which can turn freely around the sleeve $o^2$. The sleeve $o^2$ has an arm $o^3$ extending from it the end of which engages with the teeth of the wheel $m^2$ and the sleeve $p^2$ has a similar arm $p^3$ which engages with the teeth of the wheel $n^2$. To make them engage with the teeth of these wheels the spindle $q$ is pressed endwise by a spring $o^4$. At the end of each line they are liberated from the teeth of the wheels by the spindle $q$ being pressed endwise in the opposite direction. This is done by a pin $q'$ which projects from it being acted upon by an arm $r'$ which extends from an axis $r$ that carries the armature $r^2$ of an electro magnet $r^3$ see Figs. 4, 4$^a$ and 4$^b$. An electric current is sent through the coils of this magnet at the time when the second of the special spaces which are delivered from the composing machine at the end of each line is discharged from the channel or reservoir containing these spaces. This electric circuit is marked 5, in Fig. 1. When the two indicator hands $o'\ p'$ are thus set free they are turned back to their zero position one by the action of a coiled spring $o^5$ contained in a case $o^6$ the other by the action of a spring $p^5$ contained in a case $p^6$. The sleeve $p^2$ which carries the hand of the space dial has also upon it a segment $p^7$ see Figs. 3 and 4 and 7$^a$ 7$^b$ which has figures projecting from its circumference denoting the number of spaces. The end of an arm $s$ is made to strike a strip of paper $s^x$ against the segment at the time when the first of the special spaces is delivered from the composing machine at the end of each line. The arm $s$ is for this purpose carried by an axis $s'$ which also carries the armature $s^2$ of an electro magnet $s^3$ through the coils of which an electric circuit marked 4 in Fig. 1 is completed at the time when the first of the special spaces is discharged from the reservoir of the composing machine in which these spaces are contained.

The paper is led from a reel $s^4$, (see Fig. 7$^a$) over a bar $s^5$, and then between a pair of rollers $s^6$, the lower one of which is pressed upward against the upper one by a spring $s^7$. On the axis of the upper roller is a ratchet wheel $s^8$; a pawl $s^9$, carried by and arm $s^{10}$, which can be rocked around the axis of the roller engages with the teeth of the ratchet wheel. The end of the arm enters a hole in the arm $s$, so when the arm is thrown upward by the action of the electro-magnet $s^3$, the arm $s^{10}$ is carried upward with it, the pawl $s^9$, then slipping over the teeth of the ratchet wheel. After the strip of paper $s^x$, has thus been struck upward against one or other of the type on the segment $p^7$, it is drawn back by the action of the spring $s^{11}$, the pawl then turns the ratchet wheel and the rollers feed the paper forward a distance ready for the next printing movement.

$s^{12}$ is a small color roller pressed by a light spring $s^{13}$ against the surface of the type to supply color to them. In this way a record is kept of the number of spaces introduced into each line so that when the lines are subsequently justified it is unnecessary to count the number of spaces is them.

Figs. 9 to 12 show the mechanism for dividing the continuous line of type into lines. Fig. 9 is a view taken at right angles to the receiving galley. Fig. 10 a view taken parallel with the galley. Fig. 11 is a section on a larger scale taken through $a\ b$. Fig. 9 and Fig. 12 is an end elevation on a small scale of the whole machine. Figs. 13 to 19 are diagrams explaining the action of the same.

When any type are taken from the boxes W, W', and set up into line with the other type their thickness is recorded on the indicator mechanism by the operator pressing down one or other of a line of contact keys W$^2$, on the composing table Y, and thereby completing an electrical circuit through one or other of the magnets C$^3$ to C$^{12}$. One of such electrical circuits is marked 3 in Fig. 1. All of such circuits are shown in Fig. 1$^a$.

A is the channel along which the continuous line of type is made to advance as hereinbefore described.

B B are the type and C C the special blanks or spaces which are inserted at the end of each line into which the continuous line is to be divided.

D is the finger or feeler which is pressed lightly against the type by a spring E. When a pair of special blanks or spaces C arrives below the feeler the end of the feeler drops between them as shown in diagram Fig. 13 and pins G which are carried by the same arm as the feeler drop into two holes in the foremost blank. The feeler and pins are carried by a lever arm D' which turns on an axis at D$^2$. This axis is carried by a block D$^3$ which can be moved to and fro along horizontal guide bars D$^4$.

D$^5$ is an arm extending from the axis D$^2$ on the opposite side to the arm D'. When the pins G drop into the holes in the foremost special blank the block D³ is drawn along with the type.

H H, see Figs. 9 and 10, are rods parallel with the guide bars D⁴. They can be moved endwise to and fro through guides H'.

H² is a crosshead connecting the two rods H.

H³ is a connecting rod coupling this crosshead to a crank pin H⁴ which stands out from the side of a wheel H⁵ to which a slow continuous revolving motion is imparted.

H⁶ is a pawl carried by a crosshead H⁷ which couples together the foremost ends of the rods H. When the pins G have dropped into the holes in the foremost special blank the end of the lever arm D⁵ comes into position to be caught by the pawl H⁶ and to be driven forward by it as the pawl is moved forward by the crank. The several type in front of the special blank which is so driven forward along the channel A are in this way delivered into one of the compartments of the galley I—as shown in diagram 15.

Figure 13:
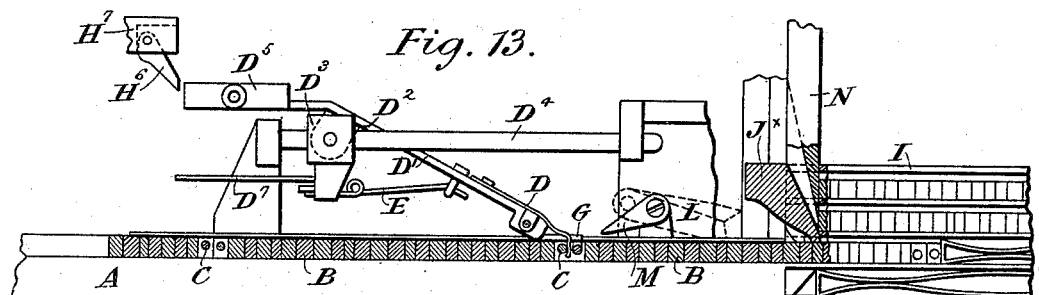
Figure 14:
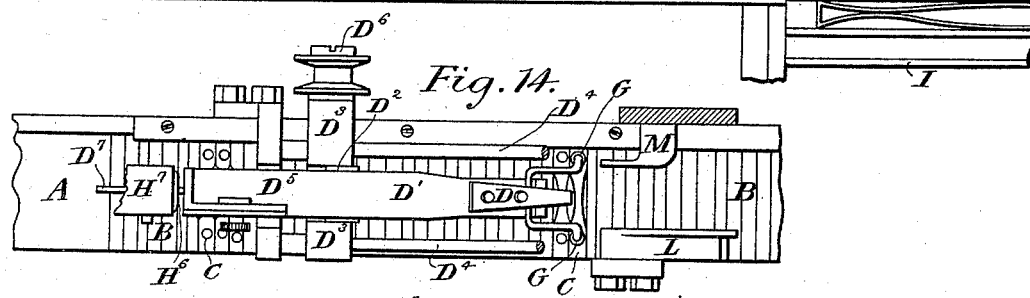
Figure 15:
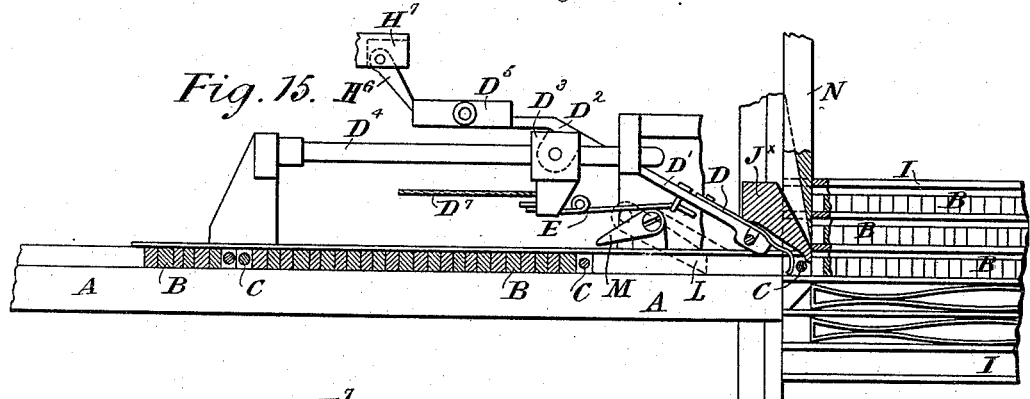
Figure 16:
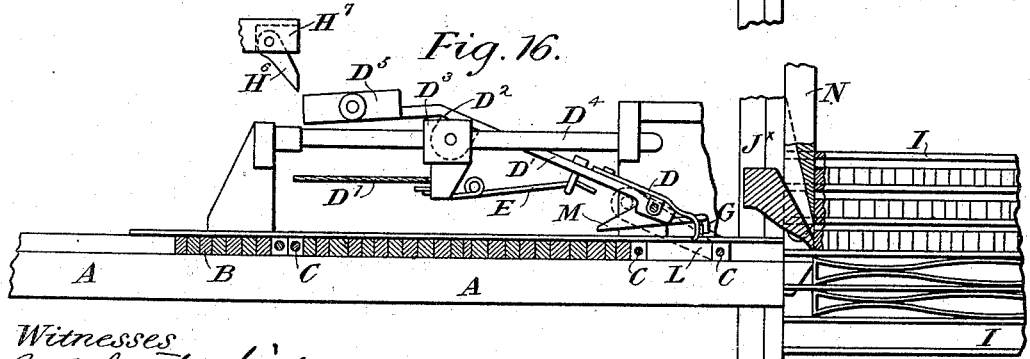
Figure 17:
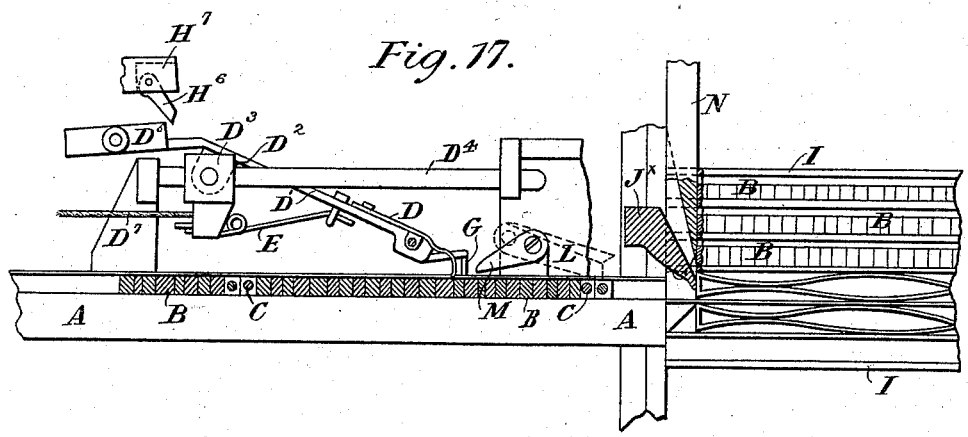
Figure 18:
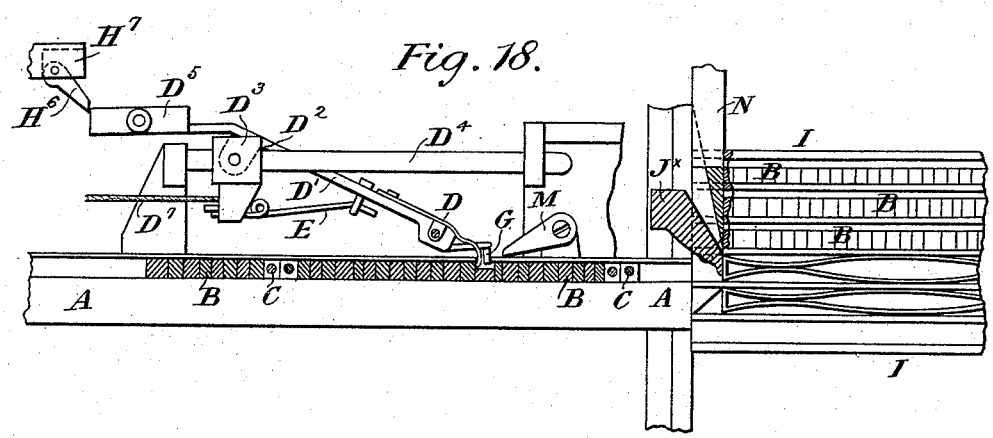
Figure 19:
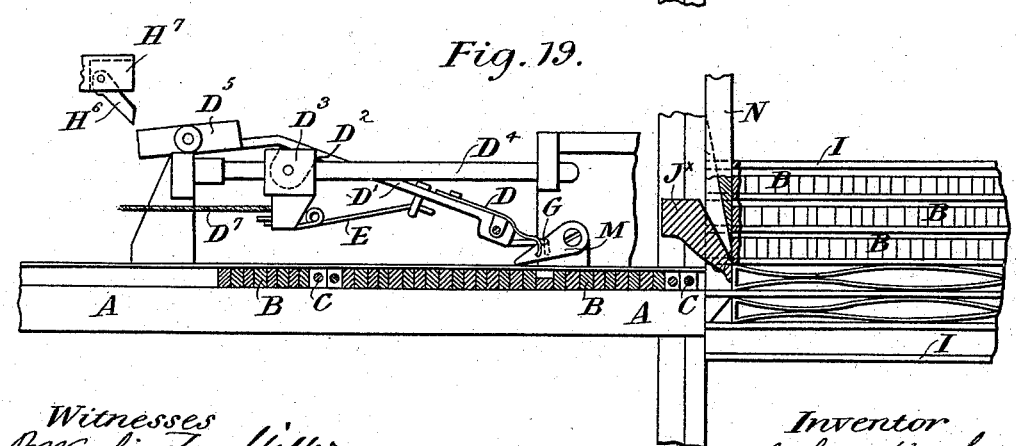

J˟ is a spring catch which then drops down behind the last type and between it and the foremost special blank. The galley is now moved upward one step. This is done in the following manner see Figs. 9, 10, 11, 11ª, 11ᵇ, 11ᶜ, 11ᵈ and 11ᵉ. The galley holder I' has fixed along the center of its under side a toothed rack I² see Fig. 11 into which gears a pinion I³ on a spindle I⁴ see Figs. 10 and 11. On this spindle is a ratchet wheel I⁵. K is a spring pawl which engages with the ratchet wheel and restrains the galley holder from descending. This pawl is seen clearly in Fig. 11. K' is a spring pawl carried by an arm K² which can turn around the spindle I⁴ and which is connected by a link to a lever arm J' as shown in Fig. 11. This lever arm as shown in Fig. 9 extends from an axis J which has also extending from it another arm J². When the block D³ is moved forward along the guide bars D⁴ a small wheel D⁶ which it carries comes against the lever arm J² and thereby turns the arm K² a distance around the spindle I⁴ see Fig. 11ᵈ and brings the pawl K' into position to engage with another tooth of the ratchet wheel I⁵ to that with which it was previously engaging. Afterward when the rods H and crosshead H⁷ are drawn back by the action of the crank pin a small wheel H⁸ comes against the lever arm J² and moves it back to its former position—(see Fig. 11ᶜ) thereby turning the ratchet wheel and moving the galley holder one step upward. As the rods H and pawl H⁶ are drawn back by the action of the continuously revolving crank the block D³ is drawn backward likewise by a weighted cord D⁷ which constantly draws back the block and keeps the upper end of the lever D⁵ bearing against the pawl H⁶ and the pins G draw back with them the special blank that they are holding until the wire stems of the pins come against an incline L see diagram 16 which lifts them and disengages the pins from the blank and so soon as the pins are disengaged from the blank the incline further tilts the lever D' until its rear end D⁵ comes below the pawl H⁶ as shown in diagram Fig. 16. The block is then at once drawn backward by the weighted cord to the end of its travel and it remains in this position until the pins G again drop into the holes of one of the special blanks. M is a fixed incline situated a short distance in front of the pins G at the time when they are in their rearmost position. This incline is to prevent a portion only of a line being delivered into the galley should any one or other of the type in the line be turned over on to its side as shown in diagram Fig. 18. If the type so turned over is so thin that the pins G drop sufficiently for the rear end of the lever D⁵ to be raised into position for the driving pawl H⁶ to engage with it when the pawl makes its next forward movement the lever D⁵ would be pushed forward by the pawl and the pins G would carry forward into the galley all type that were in front of them. The incline prevents this because as the pins commence to make their forward movement its thin end comes under the bent wire stems of the pins and lifts them until the rear end of the lever D⁵ is disengaged from the driving pawl H⁶ as shown in diagram Fig. 19. If the pins G, drop into holes in a special space blank as shown at Figs. 13 and 14, the bent wire stem of one of the pins G, passes below the incline M, so that in this case the incline cannot cause the feeler to be lifted and therefore all type in front of it will be delivered into the galley.

N is a bar which serves to retain the type within the galley when the galley is taken away after being filled with lines of type. The several division plates of the galley are notched for the bar to lie in. When the galley is full catches O O hinged to the top and bottom of the galley are made to drop over the bar and lock it to the galley—and the galley can then be carried away without any risk of type dropping out from it. While a galley is being filled the bar is held in place by a pin P passing through a hole in its upper end. When the galley has been taken away the galley holder is lowered to its lowest position to bring it into place for carrying the next galley which is to be filled and for moving it upward step by step after each line of type is placed into it. When the galley holder is to be lowered both of the pawls K K' are disengaged from the ratchet wheel I⁵ by pressing upon the lever R and the galley holder can then be lowered quietly by turning the pinion I³ by a handle I⁶ which is fast on its axis.

What I claim is:—

1. The combination of a channel mechanism for setting up type in line and for causing the line to travel forward continuously along the channel—guides parallel with the channel—a finger or feeler—a block by which it is carried, means for sliding it along said guides—a spring for pressing the finger lightly against the type—means for drawing such block back into its normal position—a pusher means for reciprocating it to and fro continuously parallel with the channel and clear of the finger when the finger is resting upon the type but which when the end of the finger drops into a gap in the type comes against the finger and pushes it forward so causing the finger to carry forward all type that are in front of it into the galley.

2. The combination of a channel mechanism for setting up type in line and for causing the type to travel forward continuously along the channel—the finger or feeler bearing lightly upon the type—the block by which the finger is carried—means for drawing the block back into its normal position—the pusher means for reciprocating it to and fro clear of the finger so long as the finger is resting upon the type but which pushes the finger forward when the finger drops—the galley and mechanism for shifting the galley a step endwise when the pusher goes back after each forward movement of the finger.

3. The combination of a channel mechanism for setting up type in line and for causing the type to travel forward continuously along the channel—the finger or feeler bearing lightly upon the type—the block by which the finger is carried—means for drawing the block back into its normal position—the pusher means for reciprocating it to and fro clear of the finger so long as the finger is resting upon the type but which pushes the finger forward when the finger drops—and the incline for lifting the finger on its next backward movement and so setting it free from the pusher.

4. The combination of a channel mechanism for setting up type in line and for causing the type to travel forward continuously along a channel—the finger or feeler bearing lightly upon the type—the block by which the finger is carried—means for drawing the block back into its normal position—the pusher means for reciprocating it to and fro clear of the finger so long as the finger is resting upon the type but which pushes the finger forward when the finger drops—and the incline for lifting the finger and disengaging it from the pusher so soon as it commences its forward movement if the finger has not dropped to its lowest position.

5. In a type setting machine the combination of a series of reservoirs containing the various type used—mechanism for ejecting the type one by one from the reservoirs and setting them up in line—a series of electro magnets one for every thickness of type used—contact mechanism for completing an electric circuit through the coils of one or other of these magnets whenever a type is ejected from any one of the reservoirs—magnet armatures normally held away from the magnets each at a different distance to the others—a pointer or indicator and mechanism interposed between it and the armatures by which each time an armature is attracted it is moved a greater or less distance according to which armature is attracted.

6. In a type setting machine the combination of a series of reservoirs containing the various type and spaces used—mechanism for ejecting the type and spaces one by one from the reservoirs and setting them up in line—a series of electro magnets one for every thickness of type used—an electro magnet for the spaces—contact mechanism for completing an electric circuit through the coils of one or other of the magnets whenever a type or space is ejected—the armatures of the series of type magnets normally held away from the magnets each at a different distance to the others—the armature of the space magnet also held normally away from this magnet—a pointer or indicator and mechanism interposed between it and the armatures of the type and space magnets by which each time that one of these armatures is attracted it is moved a greater or less distance according to which armature is attracted—another pointer or indicator and mechanism interposed between it and the armature of the space magnet by which when this armature is attracted the pointer or indicator is moved a distance as well as the pointer or indicator worked by the other armatures.

7. In a type setting machine the combination of a series of reservoirs containing the various type used—mechanism for ejecting the type one by one from the reservoirs and setting them up in line—a series of electro magnets one for every thickness of type used—contact mechanism for completing an electric circuit through the coils of one or other of these magnets whenever a type is ejected from any one of the reservoirs—the armatures of the magnets—a spindle on which they are mounted loosely—a spring or weight for normally holding each armature away from its magnet, each at a different distance to the others—a spring or weight for normally holding the spindle in one position—arms extending from the spindle which come below the armature so that the spindle is rocked whenever any armature is attracted—a pawl carried by an arm extending from the spindle—a ratchet wheel with which the pawl engages—an indicator or pointer clutched to the ratchet wheel but which can be liberated each time that a line is completed and a spring or weight for them moving the indicator or pointer back to zero.

8. In a type setting machine the combination of a series of reservoirs containing the various type used—mechanism for ejecting the type one by one from the reservoirs and setting them up in line—a series of electro magnets one for every thickness of type used—contact mechanism for completing an electric circuit through the coils of one or other of these magnets whenever a type is ejected from any one of the reservoirs—the armatures of the magnets—a spindle (or geared spindles) on which they are mounted loosely—a spring or weight for normally holding each armature away from its magnet, each at a different distance to the others—a spring or weight for normally holding the spindle in one position—arms extending from the spindle which come below the armatures so that the spindle is rocked whenever any armature is attracted—a pawl carried by an arm extending from the spindle—a ratchet wheel with which the pawl engages—an indicator or pointer—a clutch coupling it to the ratchet wheel—an electro magnet through the coils of which an electric circuit is completed whenever a line dividing space is ejected from the reservoir containing it to be set up in line—the armature of this magnet and mechanism interposed between it and the clutch by which whenever the armature is attracted the clutch is disengaged and the indicator or pointer allowed to be moved back to zero by a spring or weight.

9. In a type setting machine the combination of a series of reservoirs containing the various type and spaces used—mechanism for ejecting the type and spaces one by one from the reservoirs and setting them up in line—a series of electro magnets one for every thickness of type used—an electro magnet for the spaces—contact mechanism for completing an electric circuit through the coils of one or other of the magnets whenever a type or space is ejected—the armatures of the magnets—a spindle on which they are mounted loosely—a spring or weight for normally holding each armature away from its magnet each at a different distance to the others—a spring or weight for normally holding the spindle in one postion—arms extending from the spindle which come below the armatures so that the spindle is rocked whenever any armature is attracted—a pawl carried by an arm extending from the spindle—a ratchet wheel with which the pawl engages—an indicator or pointer and a clutch coupling it to the ratchet wheel—a pawl carried by an arm extending from the armature of the space magnet—a ratchet wheel with which the pawl engages—an indicator or pointer and a clutch coupling it to the ratchet wheel.

10. In a type setting machine the combination of a series of reservoirs containing the various type and spaces used—mechanism for ejecting the type and spaces one by one from the reservoirs and setting them up in line—a series of electro magnets one for every thickness of type used—an electro magnet for the spaces—contact mechanism for completing an electric circuit through the coils of one or other of the magnets whenever a type or space is ejected—the armatures of the magnets—a spindle on which they are mounted loosely—a spring or weight for normally holding each armature away from its magnet each at a different distance to the others—a spring or weight for normally holding the spindle in one position—arms extending from the spindle which come below the armatures so that the spindle is rocked whenever any armature is attracted—a pawl carried by an arm extending from the spindle—a ratchet wheel with which the pawl engages—an indicator or pointer and a clutch coupling it to the ratchet wheel—a pawl carried by an arm extending from the armature of the space magnet—a ratchet wheel with which the pawl engages—an indicator or pointer and a clutch coupling it to the ratchet wheel—an electro magnet through the coils of which an electric circuit is completed whenever a line dividing space is ejected from the reservoir containing it to be set up in line—the armature of this magnet and mechanism interposed between it and the clutches by which whenever the armature is attracted the clutches are disengaged and the indicators or pointers allowed to be moved back to zero.

11. In a type setting machine the combination of a series of reservoirs containing the various type and spaces used—mechanism for ejecting the type and spaces one by one from the reservoirs and for setting them up in line—an electro magnet—contact mechanism for completing an electric circuit through the coils of this magnet whenever a space is ejected—the armature of the magnet normally held away from the magnet—an arc with consecutive numbers upon it—mechanism interposed between it and the armature by which it is turned a distance each time the armature is attracted—a hammer by which a strip of paper is struck—a magnet armature carrying this hammer—its magnet—mechanism for introducing a dividing space into the line at the end of each short line into which the continuous line is to be divided and contact mechanism for sending an electric current through the coils of the magnet whenever a dividing space is inserted into the line so as then to cause the armature to be attracted and the paper to be struck by the hammer against one or other of the figures on the arc.

JOHN HOOKER.

Witnesses:
  WILMER M. HARRIS,
  JOSEPH LAKE,
*Both of 17 Gracechurch St., London.*